Sept. 4, 1951 A. P. WEBER ET AL 2,566,645
METHOD AND MEANS FOR MAKING SEAMLESS CAPSULES
Filed Aug. 5, 1947 3 Sheets-Sheet 1
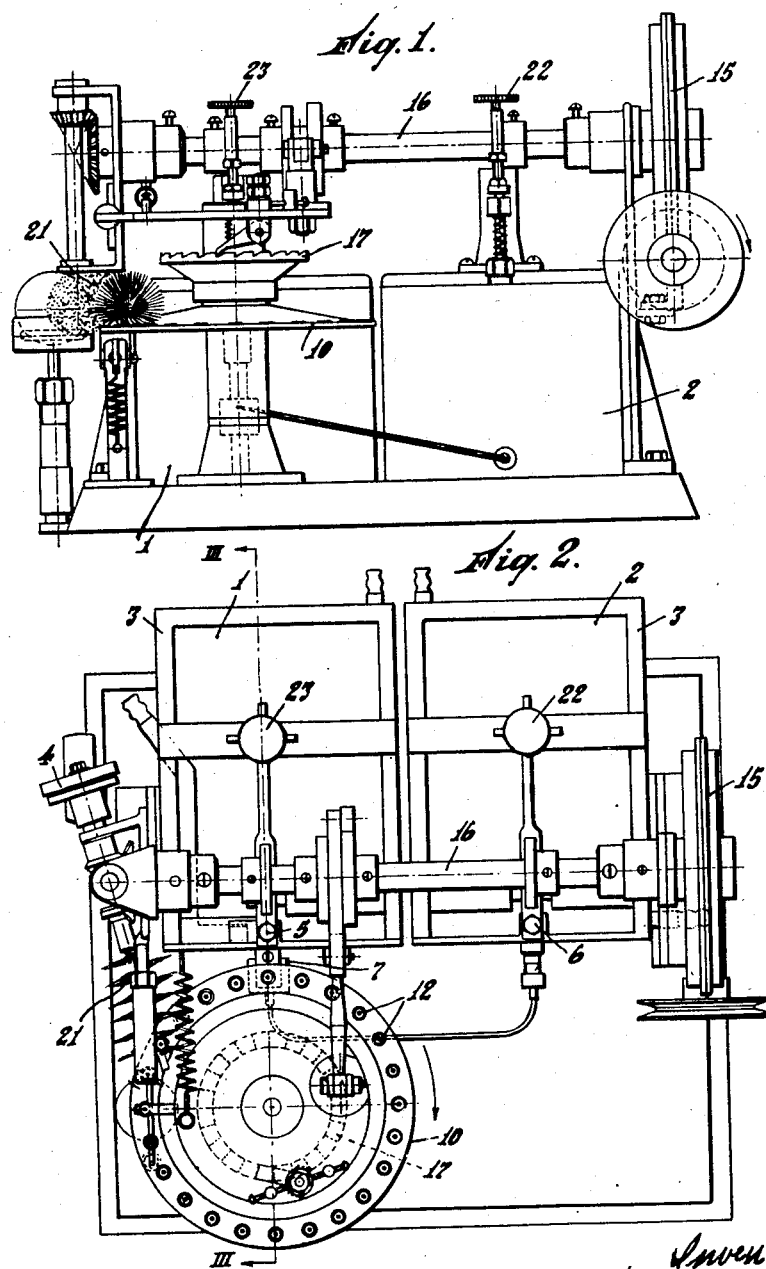

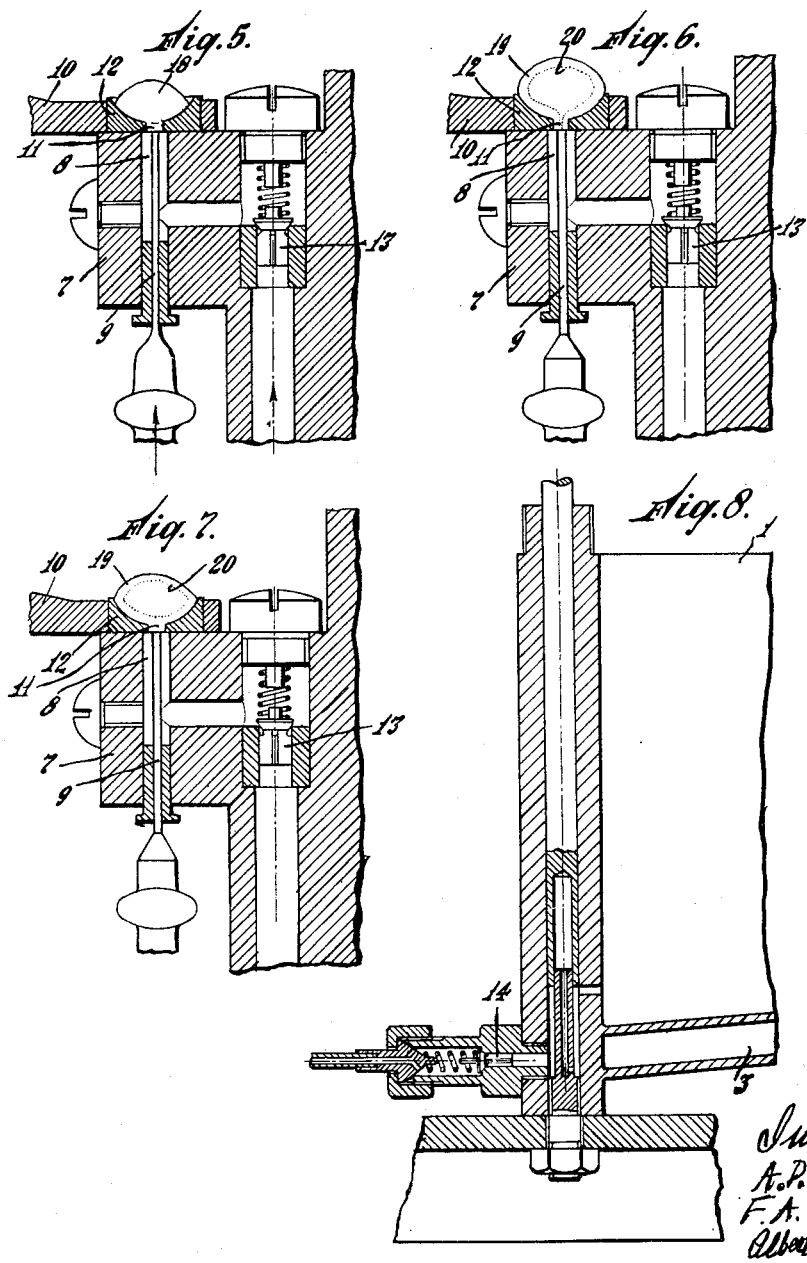

Patented Sept. 4, 1951

2,566,645

UNITED STATES PATENT OFFICE

2,566,645

METHOD AND MEANS FOR MAKING SEAMLESS CAPSULES

Anton Philip Weber, Wageningen, and Frank Anton Weber, The Hague, Netherlands, by Albertus Koerts, administrator, The Hague, Netherlands, assignors to Van den Bergh's en Jurgens' Fabrieken N. V., Rotterdam, Netherlands, a corporation of the Netherlands Application August 5, 1947, Serial No. 766,424
In the Netherlands December 12, 1941

Section 1, Public Law 690, August 8, 1946
Patent expires December 12, 1961

6 Claims. (Cl. 18—5)

Our invention relates to a method and to means for making a seamless capsule consisting of a solid wall of gelatin or other suitable material enclosing a charge of filling material, all as disclosed, for instance, in U. S. A. Patent No. 2,199,425. In accordance with said prior patent, predetermined quantities of filling material are intermittently injected into a jet or flow of plastic capsule wall forming material in fluid state extruded through an orifice, the wall forming material being allowed, immediately after its extrusion, to set. Thus, a continuous string of interconnected capsules is formed, from which string the individual capsules are severed.

In accordance with our invention, filling material is injected, in fluid state, through a nozzle into capsule wall forming material in liquid condition and in a quantity just sufficient for one capsule, whereupon the still liquid capsule and the nozzle are moved away from one another and the capsule wall forming material is allowed to set. That is to say, the connection between the capsule and the nozzle for supplying the materials is broken while the capsule wall forming material is still in more or less liquid condition. In some cases, dependent upon the nature of the capsule wall forming material, the wall of the capsule may close automatically at the injection place, but in other cases it may be desirable, after the retraction of the nozzle, to supply an additional slight amount of liquid capsule wall forming material prior to the capsule wall setting.

The invention also embraces capsules made in accordance with our novel method, which capsules have the characteristic features to be completely filled and to have a wall devoid of any structural discontinuity, except, in some cases, at the injection place.

Since, as already stated, gelatin is a suitable capsule wall forming material, in the following description it will be supposed that a solution of gelatin is used, for instance, a mass composed of 50 parts by weight of water, 50 parts by weight of gelatin and 15 parts by weight of glycerine, said mass, for the sake of brevity to be called "gelatin." It will, however, be understood that any other suitable material may be used for the purpose and that the invention is not limited to the use of liquids capable of setting when cooled, but that it also comprises, inter alia, the employment of a solution adapted to solidify by coagulation, or by evaporation of a solvent.

The filling material is injected in liquid, at all events in fluid state, for instance, in the form of a fine powder, and may be capable of solidifying by cooling. It may be immiscible with water and be constituted, for instance, by a solution of a medicine in oil, but our method is also suitable for making capsules filled with aqueous liquids miscible with the liquid capsule wall forming material.

In accordance with our invention, a predetermined quantity, for instance a drop of liquefied gelatin may be deposited on a base not capable of being wetted by water, for instance, on a fatty dish, whereupon the needle of a filled injection syringe is introduced into the drop, the desired quantity of the filling material injected thereinto, and the needle retracted. If the charge is immiscible with gelatin, the capsule wall will close automatically, so that it suffices to allow the filled drop to cool down; if it is miscible therewith, it is advisable, in order to ensure the closure, to supply a slight additional amount of gelatin at the injection place.

In most cases, the drop will not be spherical when in liquid state, but when cooled down it ordinarily assumes a more or less spherical shape.

The formation of a drop of the desired size and shape is more easily ensured when the required amount of gelatin is fed into a bowl-shaped receptacle and the injection needle is introduced into the surface of the drop. However, the needle may as well be introduced through a small orifice in the bottom of the receptacle, when it is advisable for the end face of the needle to be cut off at right angles to the needle axis. Also in this case the wall of the capsule will close automatically after retraction of the needle, if the charge is not miscible with the liquid wall forming material.

In another embodiment of our invention, the materials are supplied through concentric tubes, viz. the gelatin by the outer and the charge through the inner tube. Preferably, both tubes open into a bowl-shaped receptacle as referred to hereinbefore. Said tubes may assume a vertical position with their mouths pointing down, whereby a suspended drop is formed. With a view to increased adhesion, the mouth of the outer tube may be flared. In operation, gelatin is supplied first, and after a drop thereof has been extruded, filling material is injected thereinto through the inner tube. Also in this case the capsule wall will, as a rule, close automatically.

It will be realized that, when the invention is practised as stated in the preceding paragraph, the weight of the filled capsule is necessarily limited to a low value. For making a capsule having a relatively considerable weight, it is advisable to dispose the tubes with their mouths pointing upward and opening into an orifice in the bottom of a small bowl provided vertically above said tubes. Said bowl may, for instance, be secured to a rotary disk or the like in such a manner as to be capable, immediately after the filling of the capsule, to be removed and replaced by an empty bowl. This preferred embodiment of the invention will now be described in further detail with reference to the annexed drawing, wherein:

Fig. 1 is a front elevational view of the capsule making machine,

Fig. 2 is a plan view thereof,

Figs. 5, 6 and 7 illustrate, on an enlarged scale, sectional views of the injector proper in three different stages of operation, and Fig. 8 shows, also on an enlarged scale and in further detail, the pump for supplying the filling material.

Figure 3:
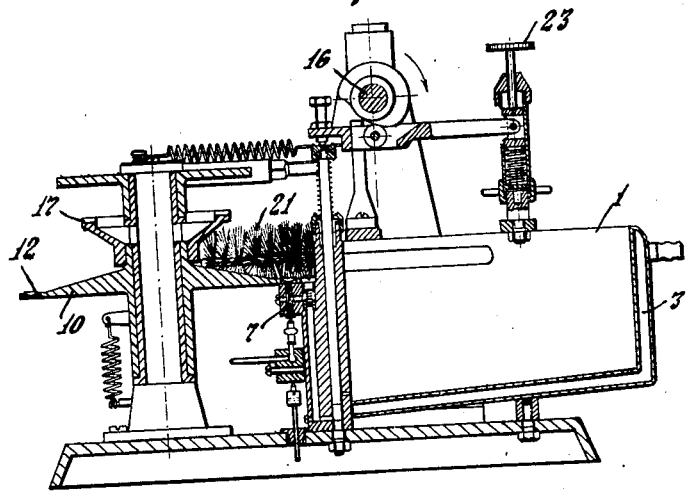
Fig. 3 is a cross sectional view along the line III—III in Fig. 2.
Figure 4:
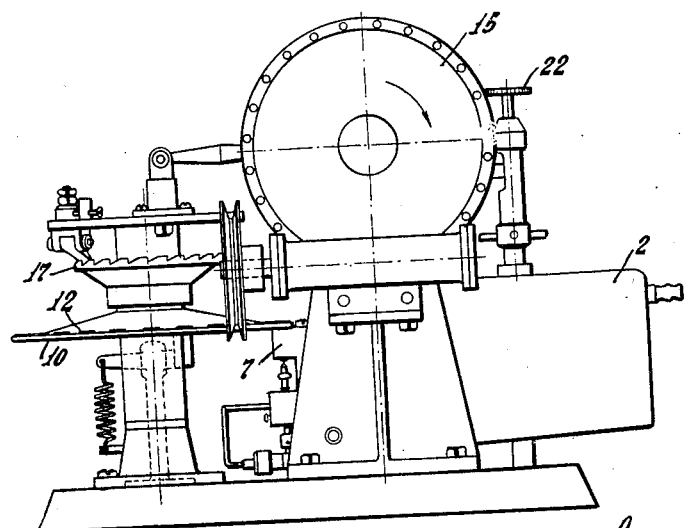
Fig. 4 is a side elevational view of the machine.

In the drawing, 1 and 2 are reservoirs for the liquid gelatin and for the liquid or fluid filling material, respectively. Let us assume that oil is used for said material. Each reservoir is provided with a jacket 3 through which hot water is circulated by a pump 4, in order to keep the liquids at the desired temperatures.

The gelatin and the oil are supplied, by pumps 5 and 6 respectively, to the injector 7 proper. The latter is provided with a passage 8 for the extrusion of gelatin, and fitted concentrically within said passage is a narrow tube 9 for supplying oil.

Situated vertically above the injector is a rotary disk 10 having a concentric row of holes, each housing a small, bowl-shaped receptacle 12 provided with a bottom orifice 11. Said receptacles are mounted to be adapted, during rotation of disk 10, to succcessively assume a position vertically above the mouth of the injector.

The pumps 5 and 6 are constituted by plunger pumps whose delivery pipes are provided with check valves. The check valve in the gelatin delivery pipe is designated by 13 in Fig. 5 and is mounted close to the injector, whereas the check valve 14 in the oil delivery pipe is shown in Fig. 8.

The plunger pumps 5 and 6 are provided with means 22 and 23, respectively, for controlling the amounts of oil and of gelatin, respectively, required for one capsule and for timing the supply of said materials to the injector.

The main shaft 16 of the machine is driven through the worm wheel 15 splined thereon, and mounted on this shaft are means, such as eccentric disks, for driving the plunger pumps. The ratchet wheel 17 serves for imparting intermittent rotary motion to disk 10. Since the construction of the driving gear is not essential as far as the invention is concerned, it will not be described, nor has it been shown, in further detail.

Figs. 5–7 more clearly show the manner wherein the capsule is made. Gelatin is supplied through the passage 8 until the required amount thereof in the form of a drop 18 has accumulated in the receptacle 12. Thereupon oil is injected, through the narrow tube 9, into the drop 18, whereby the gelatin is, so to say, inflated so as to form a wall 19 enclosing the charge of oil designated in Fig. 6 by the dotted line 20.

During the supply of oil the supply of gelatin may be interrupted. Alternatively, however, the injection of oil may begin prior to the entire amount of gelatin for the capsule having accumulated in the receptacle 12, in which case both liquids are supplied simultaneously during a short period of time, so that the drop swells by the delivery of both the filling material and the capsule wall forming material.

Obviously the oil should be injected at a moderate speed in order to prevent it from breaking through the still liquid capsule wall.

Immediately after injection of the required amount of oil into the drop of gelatin, the oil supply is cut off, whereupon the small hole in the bottom of the capsule wall may close automatically. Ordinarily, however, it may be advantageous in this stage of the operation to supply a small additional amount of gelatin to secure increased thickness of the capsule wall at said place. This final stage is illustrated in Fig. 7.

The disk 10 is now turned through a small angular distance, until the next receptacle 12 assumes a position vertically above the injector, whereupon the described operation is repeated, and so on, until all receptacles contain a charged capsule. By that time, the first capsule has sufficiently cooled down and is removed from the disk by the rotary brush 21.

The machine hereinbefore described has a capacity of say twenty-four or more capsules, even of considerable size, per minute.

As already stated, the drops of gelatin during the cooling period and in dry condition tend to assume a substantially spherical shape.

As long as the drop has not yet been extruded by the injector, the check valves 13, 14 prevent the liquids from flowing back, under the influence inter alia of surface tension, into the delivery pipes of the pumps 5, 6.

A capsule made in accordance with our invention is completely filled by the charge, unless some air or another gas has purposely been blown thereinto. This not only advantageously affects the appearance of the capsule, but also prevents oxidation of certain ingredients of the charge. These conditions are also met by capsules made as described in U. S. patent specification No. 2,199,425, but from these known capsules those made in accordance with the invention distinguish themselves by the absence of any structural discontinuity in the wall, or by the presence of such discontinuity at one place only, viz. at the place of injection, since said known capsules present such discontinuities at two diametrically opposed places. Consequently, our capsules are more regularly shaped. Completely filled capsules presenting a structural discontinuity at one place only are, to the best of our knowledge and belief, entirely new and form part of our invention, it being understood in this connection that a slight irregularity in the wall surface that may be caused by the edge of the bowl-shaped receptacle is not to be regarded as a structural discontinuity.

It may still be added that our invention is especially suitable for making gelatin capsules, containing oily solutions of vitamines, medicines and the like, but that it can as well be used for making capsules whose charge is miscible with the liquid wall forming material.

We claim:

1. A machine for making seamless capsules comprising two concentric vertically disposed tubes for supplying capsule wall forming material and filling material, respectively, a horizontally disposed member supporting [a series of bowl-like receptacles each having a bottom orifice], and means for moving at intervals said member so as to successively position said receptacles vertically above the mouths of said tubes.

2. A machine as claimed in claim 1, wherein the said member is constituted by a rotary disk provided with a concentric, circular series of holes, and by a bowl-shaped receptacle having a bottom orifice housed in each of said holes.

3. A machine as claimed in claim 1, wherein the said tubes communicate with conduits for delivering capsule wall forming material and filling material, respectively, and a non-return valve is mounted in each of said conduits.

4. The method of manufacturing a capsule filled with a filler content in a bowl-shaped cavity in a rigid support which consists in discharging and depositing a dosed amount of capsule wall forming material in the form of a solid drop into said cavity, discharging and injecting a dosed amount of filler into said drop while supported in said cavity so as to distend the same and form a filled capsule, and relatively moving said capsule and the injecting means in a horizontal plane away from one another.

5. The method of manufacturing a capsule filled with a filler content comprising discharging and depositing a dosed amount of capsule wall forming material in the form of a solid drop onto a rigid support, discharging and injecting a dosed amount of filler into said supported drop to distend the same and form a filled capsule, discharging an additional amount of capsule wall forming material at the place of injection, and then relatively moving the capsule and the injecting means in a horizontal plane away from one another.

6. Apparatus for manufacturing a capsule filled with a filler content comprising a capsule wall forming material tank, a bowl-shaped support of rigid material, means for discharging a dosed amount of capsule wall forming material from said tank and depositing said discharged amount of material in the form of a solid drop into said bowl-shaped support, a filler tank, means for discharging a dosed amount of filler from said filler tank and injecting said discharged amount of filler in the form of a jet into a drop of capsule wall forming material supported by said support, and means for relatively moving the support and the injecting means in a horizontal plane away from one another.

ANTON PHILIP WEBER.
ALBERTUS KOERTS,
*Administrator in Connection with Patent Rights of Frank Anton Weber.*

REFERENCES CITED

The following references are of record in the file of this patent:

UNITED STATES PATENTS

| Number | Name | Date |
|---|---|---|
| 1,046,056 | Drake | Dec. 3, 1912 |
| 1,148,621 | Planten | Aug. 3, 1915 |
| 2,205,837 | Ravenscroft et al. | June 25, 1940 |
| 2,275,154 | Merrill et al. | Mar. 3, 1942 |
| 2,279,505 | Ravenscroft | Apr. 14, 1942 |
| 2,288,327 | Scherer | June 30, 1942 |
| 2,331,572 | Scherer | Oct. 12, 1943 |
| 2,379,816 | Mabbs (1) | July 3, 1945 |
| 2,379,817 | Mabbs (2) | July 3, 1945 |